(12) United States Patent
Oura et al.

(10) Patent No.: US 12,199,267 B2
(45) Date of Patent: Jan. 14, 2025

(54) SECONDARY BATTERY POSITIVE ELECTRODE AND SECONDARY BATTERY

(71) Applicant: Panasonic Intellectual Property Management Co., Ltd., Osaka (JP)

(72) Inventors: Yuji Oura, Osaka (JP); Yuki Tokuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 765 days.

(21) Appl. No.: 17/274,853

(22) PCT Filed: Jul. 25, 2019

(86) PCT No.: PCT/JP2019/029134
§ 371 (c)(1),
(2) Date: Mar. 10, 2021

(87) PCT Pub. No.: WO2020/066255
PCT Pub. Date: Apr. 2, 2020

(65) Prior Publication Data
US 2022/0052311 A1 Feb. 17, 2022

(30) Foreign Application Priority Data
Sep. 26, 2018 (JP) ................. 2018-180526

(51) Int. Cl.
*H01M 4/13* (2010.01)
*H01M 4/36* (2006.01)
(Continued)

(52) U.S. Cl.
CPC ............... *H01M 4/13* (2013.01); *H01M 4/36* (2013.01); *H01M 4/48* (2013.01); *H01M 4/623* (2013.01);
(Continued)

(58) Field of Classification Search
CPC ........ H01M 4/13; H01M 4/623; H01M 4/635; H01M 10/0525; H01M 4/36; H01M 4/48
See application file for complete search history.

(56) References Cited

U.S. PATENT DOCUMENTS

| | | |
|---|---|---|
| 2007/0042270 A1 | 2/2007 | Ohata et al. |
| 2015/0303484 A1 | 10/2015 | Iida et al. |
| 2017/0187036 A1 | 6/2017 | Endo |

FOREIGN PATENT DOCUMENTS

| | | |
|---|---|---|
| CN | 105322132 A | 2/2016 |
| CN | 107068973 A | 8/2017 |

(Continued)

OTHER PUBLICATIONS

International Search Report dated Oct. 29, 2019, issued in counterpart Application No. PCT/JP2019/029134. (2 pages).
(Continued)

*Primary Examiner* — Aiqun Li
(74) *Attorney, Agent, or Firm* — WHDA, LLP (57) ABSTRACT

In the present invention, this positive electrode is provided with: a collector; and a composite material layer that is formed on at least one surface of the collector. The composite material layer includes a particulate aggregate formed from inorganic substance particles which do not occlude or emit Li, a conductive material, and a binding material for binding the inorganic particles and the conductive material. According to an exemplary embodiment, the aggregate is present closer to the collector side at least with respect to the thickness-direction center of the composite material layer, and accounts for at least 1.3 vol % with respect to the volume of the composite material layer.

13 Claims, 2 Drawing Sheets

(51) Int. Cl.
*H01M 4/48* (2010.01)
*H01M 4/62* (2006.01)
*H01M 10/0525* (2010.01)

(52) U.S. Cl.
CPC ....... *H01M 4/625* (2013.01); *H01M 10/0525* (2013.01)

(56) References Cited

FOREIGN PATENT DOCUMENTS

| | | |
|---|---|---|
| JP | 2007-048525 A | 2/2007 |
| JP | 2007-165079 A | 6/2007 |
| JP | 2007-234277 A | 9/2007 |
| JP | 2016-085957 A | 5/2016 |
| WO | 2005/078828 A1 | 8/2005 |
| WO | 2014/077384 A1 | 5/2014 |

OTHER PUBLICATIONS

Chinese Search Report dated Oct. 23, 2023, issued in counterpart CN application No. 201980057852.5. (3 pages).

SECONDARY BATTERY POSITIVE ELECTRODE AND SECONDARY BATTERY

TECHNICAL FIELD

The present disclosure relates to a positive electrode for a secondary battery and a secondary battery.

BACKGROUND ART

Conventionally, a positive electrode for a secondary battery has been proposed in which primary particles, that is, the basic particles of positive electrode active material particles, are bound to each other by a water-soluble polymer binder, aggregates obtained by connection of the primary particles (secondary particles) are bound to each other, and the secondary particles and a current collector are bound together by a fluororesin binder or rubber binder (see Patent Literature 1). Patent Literature 1 discloses that the binding force of a positive electrode mixture layer increases, thereby improving the cycle characteristics of the battery.

CITATION LIST

Patent Literature

PATENT LITERATURE 1: Japanese Unexamined Patent Application Publication No. 2007-234277

SUMMARY

It is an important issue to improve the cycle characteristics of a secondary battery such as a lithium ion battery. The technology disclosed in Patent Literature 1 may contribute to improving the cycle characteristics, but there is still room for improvement.

The positive electrode for a secondary battery according to one aspect of the present disclosure is a positive electrode for a secondary battery comprising a current collector and a mixture layer formed on at least one surface of the current collector, wherein the mixture layer includes inorganic particles that do not intercalate or deintercalate Li, a conductive agent, and a binder that binds the inorganic particles and the conductive agent together.

The secondary battery according to one aspect of the present disclosure comprises the above positive electrode, a negative electrode, and an electrolyte.

The positive electrode for a secondary battery according to one aspect of the present disclosure can improve the cycle characteristics of the battery.

DESCRIPTION OF EMBODIMENTS

As described above, it is an important issue to improve the cycle characteristics of a secondary battery such as a lithium ion battery. The reduction in capacity by charge-and-discharge of the battery is considered to be partly due to the change in the volume of a positive electrode active material to cause particle cracking of the active material. The present inventors have found that the cycle characteristics of the battery is improved by the presence of particulate aggregate composed of inorganic particles that do not intercalate or deintercalate Li, a conductive agent, and a binder in a positive electrode mixture layer. It is considered that this aggregate acts as a buffer to alleviate the effects of volume changes of the positive electrode active material due to charge-and-discharge and suppresses, for example, particle cracking of the active material.

Hereinafter an example of the embodiment of the positive electrode for a secondary battery and the secondary battery according to the present disclosure will be described in detail. Hereinafter, a cylindrical battery in which a wound electrode assembly 14 is housed in a cylindrical battery case is exemplified, and the electrode assembly is not limited to the wound type, and may be a laminate in which a plurality of positive electrodes and a plurality of negative electrodes are alternately laminated one by one via a separator. In addition, the secondary battery according to the present disclosure may be a rectangular battery having a rectangular metal case, a coin battery having a coin-shaped metal case, or the like, and a laminated battery including an exterior body being composed of a laminate sheet including a metal layer and a resin layer. In the present description, notation of "the numerical value (A) to the numerical value (B)" means "the numerical value (A) or more and the numerical value (B) or less," unless otherwise specified.

Figure 1:
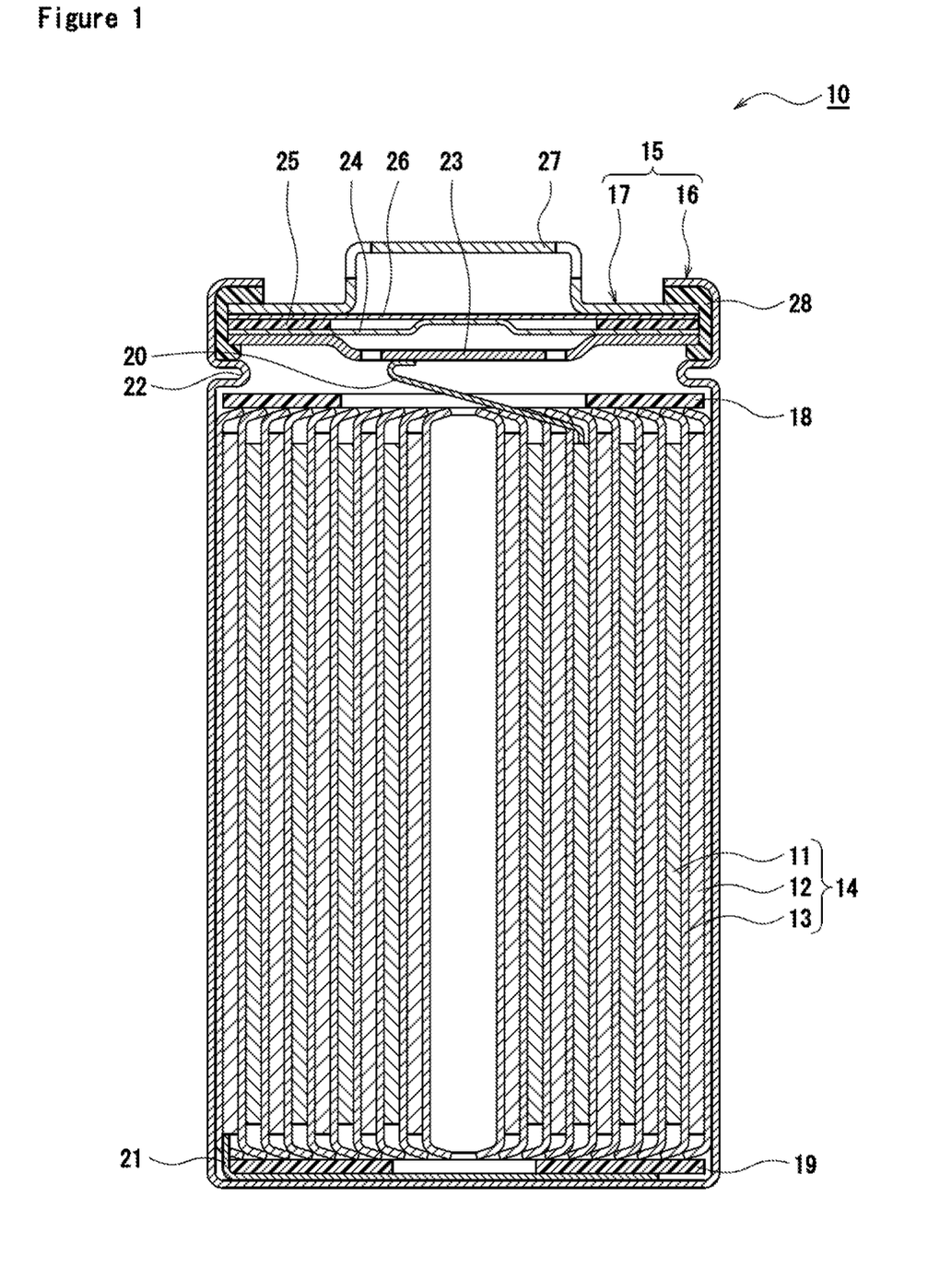
FIG. 1 is a sectional view of a secondary battery according to an example of the embodiment.

FIG. 1 is a sectional view of a secondary battery 10 according to an example of the embodiment. As illustrated in FIG. 1, the secondary battery 10 includes an electrode assembly 14, a electrolyte, and a battery case 15 that houses the electrode assembly 14 and the electrolyte. The electrode assembly 14 includes a positive electrode 11, a negative electrode 12, and a separator 13, and has a wound structure in which the positive electrode 11 and the negative electrode 12 are wound via the separator 13. A battery case 15 is composed of a bottomed cylindrical exterior can 16 and a sealing assembly 17 that closes the opening of the exterior can 16. The secondary battery 10 may be a secondary battery using an aqueous electrolyte, or may be a secondary battery using a non-aqueous electrolyte. Hereinafter, the secondary battery 10 will be described as a non-aqueous electrolyte secondary battery such as a lithium ion battery using a non-aqueous electrolyte.

A non-aqueous electrolyte includes a non-aqueous solvent and an electrolyte salt dissolved in the non-aqueous solvent. For example, esters, ethers, nitriles, amides, and a mixed solvent of two or more thereof may be used as the non-aqueous solvent. The non-aqueous solvent may contain a halogen substitute such as a fluoroethylene carbonate in which at least a part of hydrogen of these solvents is substituted with a halogen atom such as fluorine. The non-aqueous electrolyte is not limited to a liquid electrolyte, and may be a solid electrolyte. A lithium salt such as $LiPF_6$ is used as the electrolyte salt.

The secondary battery 10 includes insulating plates 18 and 19 arranged above and below the electrode assembly 14, respectively. In the example shown in FIG. 1, a positive electrode lead 20 attached to the positive electrode 11 extends to the side of the sealing assembly 17 through the through hole of the insulating plate 18, and a negative electrode lead 21 attached to the negative electrode 12 extends to the bottom side of the exterior can 16 through the outside of the insulating plate 19. The positive electrode lead 20 is connected to the lower surface of a bottom plate 23 of the sealing assembly 17, by welding or the like, and a cap 27, which is a top plate of the sealing assembly 17 electrically connected to the bottom plate 23, serves as a positive electrode terminal. The negative electrode lead 21 is connected to the inner surface of bottom of the exterior can 16 by welding or the like, and the exterior can 16 serves as a negative electrode terminal.

The exterior can 16 is, for example, a metal container with a bottomed cylindrical shape. A gasket 28 is provided between the exterior can 16 and the sealing assembly 17 to ensure the sealability inside the battery. The exterior can 16 has a projecting portion 22 for supporting the sealing assembly 17, in which a part of the side surface of the exterior can 16 protrudes inward. The projecting portion 22 is preferably formed in an annular shape along the circumferential direction of the exterior can 16, and the sealing assembly 17 is supported on the upper surface thereof.

The sealing assembly 17 has a structure in which a bottom plate 23, a lower vent member 24, an insulating member 25, an upper vent member 26, and a cap 27 are laminated in this order from the electrode assembly 14 side. Each member constituting the sealing assembly 17 has a disk shape or ring shape, for example, and each member except the insulating member 25 is electrically connected each other. The lower vent member 24 and the upper vent member 26 are connected together at their respective central portions, and the insulating member 25 is interposed between the respective peripheral portions. When the internal pressure of the battery rises due to abnormal heat generation, the lower vent member 24 is deformed and broken so as to push the upper vent member 26 toward the cap 27 side, and the current path between the lower vent member 24 and the upper vent member 26 is blocked. When the internal pressure further rises, the upper vent member 26 is broken and gas is discharged from the opening of the cap 27.

Figure 2:
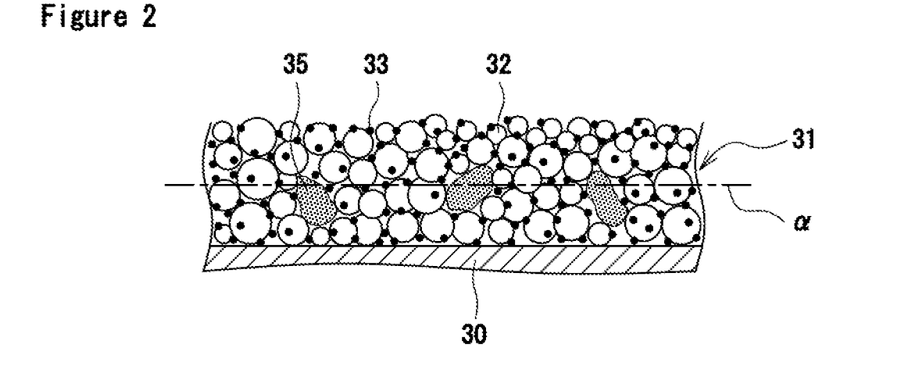
FIG. 2 is a sectional view of a positive electrode according to an example of the embodiment.
Figure 3:
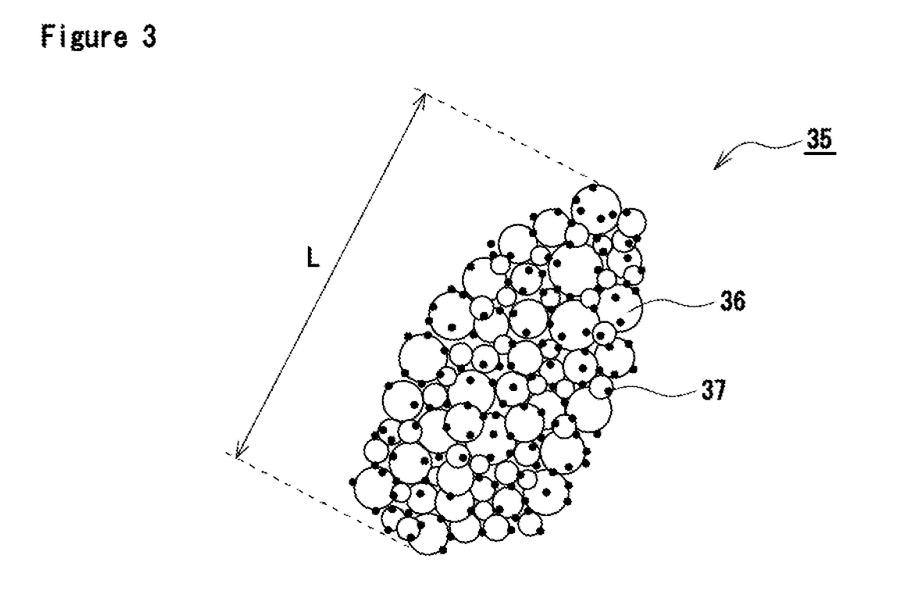
FIG. 3 is a sectional view of aggregates included in a positive electrode mixture layer.
Figure 4:
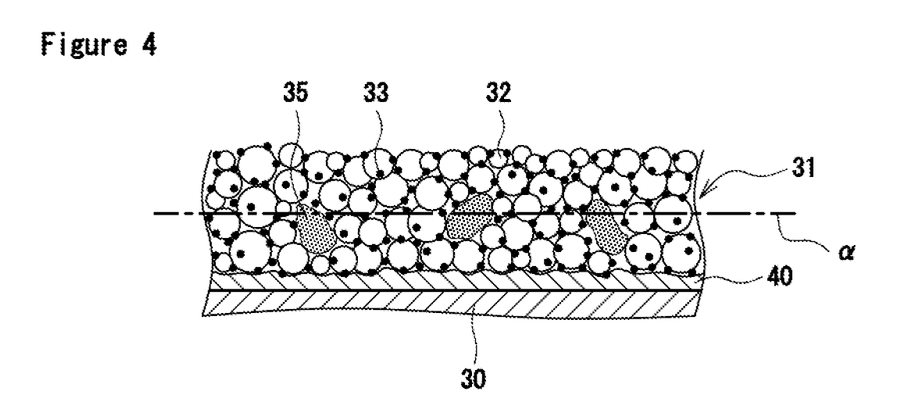
FIG. 4 is a sectional view of a positive electrode according to another example of the embodiment.

Hereinafter, the positive electrode 11, the negative electrode 12, and the separator 13 constituting the electrode assembly 14, particularly the positive electrode 11 will be described in detail with reference to FIG. 2 to FIG. 4. FIG. 2 is a sectional view of the positive electrode 11 according to an example of the embodiment, and FIG. 3 is a sectional view of an aggregate 35 included in a positive electrode mixture layer 31 of the positive electrode 11. FIG. 4 is a sectional view of the positive electrode 11 according to another example of the embodiment.

[Positive Electrode]

As exemplified in FIG. 2, the positive electrode 11 comprises a positive electrode current collector 30 and the positive electrode mixture layer 31 formed on at least one surface of the positive electrode current collector 30. A foil of a metal stable in the potential range of the positive electrode 11 such as aluminum or aluminum alloy, a film in which the metal is disposed on the surface, or the like can be used as the positive electrode current collector 30. The content of aluminum in the positive electrode current collector 30 is 50% or more, preferably 70% or more, and more preferably 80% or more with respect to the mass of the current collector. The preferable positive electrode current collector 30 is a metal foil consisting of aluminum or an aluminum alloy and has a thickness of 5 μm to 20 μm.

Preferably, the positive electrode mixture layer 31 includes a positive electrode active material 32, a conductive agent 33, and a binder (not shown in the figure), and is formed on both sides of the positive electrode current collector 30. The thickness of the positive electrode mixture layer 31 is, for example, 50 μm to 120 μm, preferably 60 μm to 100 μm on one side of the positive electrode current collector 30. The positive electrode 11 can be produced by applying onto the positive electrode current collector 30 a positive electrode mixture slurry including the positive electrode active material 32, the conductive agent 33, the binder, and the like, drying the coating film, and then compressing the coating film to form the positive electrode mixture layer 31 on both sides of the positive electrode current collector 30.

The positive electrode mixture layer 31 further includes the particulate aggregate 35 composed of inorganic particles 36 that do not intercalate or deintercalate Li, a conductive agent 37, and the binder that binds the inorganic particles 36 and the conductive agent 37 together (refer to FIG. 3 described below). The aggregate 35 may be included in only one of the positive electrode mixture layers 31 formed on both sides of the positive electrode current collector 30, but is preferably included in each of the positive electrode mixture layers 31. The aggregate 35 is included in the positive electrode mixture layer 31, for example, by being added to a positive electrode mixture slurry.

A lithium transition metal composite oxide containing transition metal elements such as Co, Mn, and Ni is used as the positive electrode active material 32. Examples of the lithium transition metal composite oxide include $Li_xCoO_2$, $Li_xNiO_2$, $Li_xMnO_2$, $Li_xCo_yNi_{1-y}O_2$, $Li_xCo_yMi_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of the group consisting of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or in combination of two or more.

The positive electrode active material 32 is generally secondary particles formed by aggregating primary particles of the lithium transition metal composite oxide. The volume-based median diameter of the positive electrode active material 32 (secondary particles) is, for example, 1 μm to 20 μm, and is preferably 3 μm to 15 μm. The median diameter of the positive electrode active material 32 is a particle size at which the volume integrated value is 50% in the particle size distribution measured by the laser diffraction scattering method, and is also called 50 percent particle size (D50).

Examples of the conductive agent 33 include carbon materials such as carbon black (CB), acetylene black (AB), ketjen black, and graphite. Examples of the binder included in the positive electrode mixture layer 31 include fluorine resins such as polytetrafluoroethylene (PTFE) and polyvinylidene fluoride (PVdF), polyacrylonitrile (PAN), polyimide resins, acrylic resins, and polyolefin resins. In addition, these resins may be used in combination with carboxymethylcellulose (CMC) or a salt thereof, or polyethylene oxide (PEO). These may be used singly or in combination of two or more.

The aggregate 35 is considered to alleviate the effect of volume changes of the positive electrode active material 32 due to charge-and-discharge and to suppress, for example, the particle cracking of the positive electrode active material 32, and therefore adding the aggregate 35 to the positive electrode mixture layer 31 improves the cycle characteristics of the battery. The aggregate 35 is scattered in the positive electrode mixture layer 31. The aggregate 35 is preferably included at 1.3 volume % or more with respect to the volume of the positive electrode mixture layer 31. The inclusion of 1.3 volume % or more of the aggregate 35 causes the effect of improving the cycle characteristics to be more significant. The upper limit of the content of the aggregate 35 is not particularly limited from the viewpoint of the cycle characteristics, but is preferably 10 volume %, and more preferably 5 volume % in consideration of, for example, positive electrode capacity.

The preferable content of the aggregate 35 in the positive electrode mixture layer 31 is 1.3 to 10 volume %, more preferably 1.3 to 5 volume %, and particularly preferably 2 to 3 volume % with respect to the volume of the positive electrode mixture layer 31. The aggregate 35 may be uniformly present throughout the positive electrode mixture layer 31, or for example, may be unevenly distributed in the vicinity of the positive electrode current collector 30. The stress associated with volume changes of the positive electrode active material 32 can act in the form of peeling of the positive electrode current collector 30 from the positive electrode mixture layer 31, and therefore the aggregate 35 is preferably present at least in the direction of the side of the positive electrode current collector 30 from the center a of the thickness direction of the positive electrode mixture layer 31.

When the positive electrode mixture layer 31 is divided in half by the center a of the thickness direction, the content of the aggregate 35 may differ between the first region located in the direction of the side of the positive electrode current collector 30 and the second region located in the direction of the surface side of the positive electrode mixture layer 31. The content of the aggregate 35 is, for example, higher in the first region than in the second region. The aggregate 35 may be substantially included only in the first region. The aggregate 35 included in the first region may be 55% or more or 60% or more of the total amount of the aggregate 35 included in the entire positive electrode mixture layer 31. In addition, a part of the aggregate 35 may be in contact with the surface of the positive electrode current collector 30.

The average value of the distance along the thickness direction of the positive electrode mixture layer 31 from the surface of the positive electrode current collector 30 to the aggregate 35 (the end of the aggregate 35 closest to the positive electrode current collector 30) corresponds to, for example, 1 to 70% of the thickness of the positive electrode mixture layer 31, and preferably corresponds to 2 to 65%. When the thickness of the positive electrode mixture layer 31 is 80 μm, an example of the average value of the distance is 1 μm to 60 μm or 2 μm to 50 μm. The average value of the distance is determined by observing the cross section of the positive electrode 11 with a scanning electron microscope (SEM) or transmission electron microscope (TEM) and then averaging the distance measured for any 10 pieces of the aggregate 35.

As exemplified in FIG. 3, the aggregate 35 is composed of the inorganic particles 36, the conductive agent 37, and a binder (not shown in the figure). The binder binds not only the inorganic particles 36 and the conductive agent 37 together but also the inorganic particles 36 to each other and the conductive agents 37 to each other. The aggregate 35 is a particle obtained by binding of a plurality of the inorganic particles 36 and the particles of a plurality of the conductive agents 37 together. The inorganic particles 36 provide adequate flexibility to the aggregate 35 and thus realize function as a buffer to alleviate the effects of volume changes of the positive electrode active material due to charge-and-discharge.

When the aggregate of the conductive agent 37 (the aggregate that does not include the inorganic particles 36) is used instead of the aggregate 35, or when only the inorganic particles 36 are used, no effect of improving the cycle characteristics of the battery is obtained. When the aggregate 35 does not include the conductive agent 37, the insulating aggregate is included in the positive electrode mixture layer, and therefore there is a risk of reduction in battery capacity due to partial blocking of the current path in the positive electrode mixture layer. The conductive agent 37 provides conductivity to the aggregate 35 and thus suppresses the increase in resistance caused by the addition of the inorganic particles 36 to the positive electrode mixture layer 31. When the aggregate 35 does not include the inorganic particles 36, the aggregate is inflexible and difficult to function as a buffer.

The content of the inorganic particles 36 in the aggregate 35 is preferably 40 to 99% by mass, more preferably 70 to 98% by mass, and particularly preferably 90 to 97% by mass, with respect to the mass of the aggregate 35. Thus, the main component (the component with the highest mass ratio) of the aggregate 35 is the inorganic particles 36. As long as the content of the inorganic particles 36 is within the above range, the function of the aggregate 35 as a buffer is easily expressed and the effect of improving the cycle characteristics is more significant.

The content of the conductive agent 37 in the aggregate 35 is preferably 0.5 to 10% by mass, and more preferably 1 to 5% by mass. The conductive agent 37 provides conductivity to the aggregate 35 and thus suppresses the increase in resistance caused by the addition of the inorganic particles 36 to the positive electrode mixture layer 31. As long as the content of the conductive agent 37 is within the above range, the increase in resistance can be effectively suppressed. Similarly, the content of the binder is preferably 0.1 to 10% by mass, and more preferably 1 to 5% by mass. As long as the content of the binder is within the above range, the strength, flexibility, and the like of the aggregate 35 are easy to be maintained at appropriate values.

The average particle size of the aggregate 35 is preferably 1 μm to 5 μm, and more preferably 1.5 μm to 4 μm. An example of the lower limit of the average particle size is 1 μm, 1.5 μm, or 2 μm. An example of the upper limit of the average particle size is 5 μm, 4 μm, or 3 μm. The average particle size of the aggregate 35 is preferably smaller than D50 of the positive electrode active material 32. An example of the aggregate 35 has the average particle size larger than ½ of D50 of the positive electrode active material 32. Another example of the aggregate 35 has the average particle size smaller than ½ of D50 of the positive electrode active material 32.

The average particle size of the aggregate 35 is determined by observing the particles of the aggregate 35 with SEM or TEM, measuring each of the maximum crossover length L for any 10 pieces of particles, and then averaging the measured values. The shape of the aggregate 35 is not particularly limited, and the aggregate 35 may be a particle with a shape close to the true sphere, or may be a particle with a large aspect ratio.

The inorganic particles 36 are particles of an inorganic compound and are composed of at least one selected from, for example, a metal oxide and a metal hydroxide. Specific examples of the preferable metal oxide and metal hydroxide include manganese oxide, silicon dioxide (silica), titanium dioxide (titania), aluminum oxide (alumina), aluminum hydroxide, and boehmite. Of these, at least one selected from aluminum oxide, aluminum hydroxide, and boehmite is preferable. The metal compound constituting the inorganic particles 36 may contain at least one of 0.001 to 2% by mass of an alkali metal and 0.1 to 4% by mass of an alkaline earth metal.

The inorganic particles 36 may be particles that are composed of at least one selected from a sulfate, a hydroxide, and an oxide of an alkaline earth metal or an alkali metal. Specific examples thereof include at least one particles selected from barium sulfate ($BaSO_4$), magnesium hydroxide ($Mg(OH)_2$), magnesium oxide (MgO particles), and lithium oxide ($Li_2O$).

In addition, the inorganic particles 36 may be a metal phosphorus oxide. Specific examples thereof include at least one particles selected from lithium phosphate ($LiPO_4$) lithium hydrogen phosphate ($Li_2HPO_4$), aluminum phosphate ($AlPO_4$), and manganese phosphate hydrate ($Mn_3(PO_4)_2 \cdot 3H_2O$). The inorganic particles 36 may be used singly or in combination of two or more. For example, aluminum oxide particles and metal phosphate compound particles may be used in combination.

The average particle size of the inorganic particles 36 is, for example, 0.01 µm to 1 µm, and preferably 0.05 µm to 0.8 µm. The average particle size of the inorganic particles 36 is determined by observing the particles of the aggregate 35 with SEM or TEM, measuring each of the maximum crossover length for, for example, any about 100 pieces of the inorganic particles 36, and then averaging the measured values.

One that is the same as the conductive agent applied to the positive electrode mixture layer 31 can be used as the conductive agent 37 constituting the aggregate 35, for example, conductive particles such as CB, AB, ketjen black, and graphite. The conductive agent 37 attaches to the surface of the inorganic particles 36 by the binder to provide conductivity to the aggregate 35. The avenge particle size of the conductive agent 37 is preferably smaller than the average particle size of the inorganic particles 36.

One that is the same as the binder applied to the positive electrode mixture layer 31 can be used as the binder constituting the aggregate 35, for example fluororesin such as PTFE and PVdF, PAN, polyimide resin, acrylic resin, and polyolefin resin. Of these, PVdF is preferable.

As exemplified in FIG. 4, the positive electrode 11 may comprise an intermediate layer 40 interposed between the positive electrode current collector 30 and the positive electrode mixture layer 31. The intermediate layer 40 is arranged so as to be in contact with the surface of the positive electrode current collector 30. The intermediate layer 40 inhibits the redox reaction between the positive electrode current collector 30 and the lithium transition metal composite oxide as the positive electrode active material when abnormality such as internal short circuit occurs, thereby suppressing heat generation. The intermediate layer 40 includes the inorganic particles, the conductive agent, and a binder, and is composed mainly of the inorganic particles. The thickness of the intermediate layer 40 is not particularly limited, but is preferably 1 µm to 10 µm or 1 µm to 5 µm. The surface of the positive electrode current collector 30 may have an area in which the intermediate layer 40 is not formed, and in this area, the positive electrode mixture layer 31 is formed directly on the positive electrode current collector 30. When the positive electrode 11 comprises the intermediate layer 40, the aggregate 35 may be unevenly distributed in the vicinity of the intermediate layer 40, or a part of the aggregate 35 may be in contact with the surface of the intermediate layer 40.

The inorganic particles that do not intercalate or deintercalate Li and are composed of the same materials as those of the inorganic particles 36 can be applied to the inorganic particles included in the intermediate layer 40, and one that is the same as the inorganic particles 36 may be used. The intermediate layer 40 may be composed of the same materials as those of the aggregate 35 for example, or may be composed of different materials. In addition, when the intermediate layer 40 is composed of the same materials as those of the aggregate 35, the content of the constituent materials in the intermediate layer 40 may be the same as the case of the aggregate 35. A part of the aggregate 35 may be in contact with the intermediate layer 40. The intermediate layer 40 can be formed by applying onto the surface of the positive electrode current collector 30 an intermediate layer slurry including the constituent materials such as inorganic particles to constitute the intermediate layer 40, and then drying the coating film.

[Negative Electrode]

A negative electrode 12 comprises a negative electrode current collector and a negative electrode mixture layer formed on at least one surface of the negative electrode current collector. A foil of a metal stable in the potential range of the negative electrode 12 such as copper or copper alloy, a film in which the metal is disposed on the surface, or the like can be used as the negative electrode current collector. Preferably, the negative electrode mixture layer includes a negative electrode active material and a binder, and is formed on both sides of the negative electrode current collector. The negative electrode 12 can be produced by applying onto a negative electrode current collector a negative electrode mixture slurry including, for example, a negative electrode active material and a binder, drying the coating film, and then compressing the coating film to form the negative electrode mixture layer on both sides of the current collector.

The negative electrode active material is not particularly limited as long as it can reversibly intercalate and deintercalate lithium ions, and a carbon material such as graphite is generally used. The graphite may be any of natural graphite such as flake graphite, lump graphite, and earth graphite and artificial graphite such as lump artificial graphite and graphitized mesophase carbon microbeads. In addition, as the negative electrode active material, metals such as Si and Sn that are alloyed with Li, metal compounds including Si and Sn, and lithium titanium composite oxides may be used. The Si-containing compound represented by $SiO_x$ ($0.5 \leq x \leq 1.6$) may be used in combination with a carbon material such as graphite.

As a binder included in the negative electrode mixture layer, fluorine-containing resin such as PTFE and PVdF, PAN, polyimide, acrylic resin, and polyolefins may be used as in the case of the positive electrode 11, but stryene-butadiene rubber (SBR) is preferably used. In addition, the negative electrode mixture layer may include CMC or a salt thereof, polyacrylic acid (PAA) or a salt thereof. PVA, or the like. The negative electrode mixture layer 41 includes, for example, SBR and CMC or a salt thereof.

[Separator]

As a separator 13, a porous sheet having ion permeability and insulating property is used. Specific examples of the porous sheet include a microporous thin film, a woven fabric, and a non-woven fabric. As the material of the separator, polyolefins such as polyethylene and polypropylene, cellulose, and the like are suitable. The separator 13 may have a single-layer structure or a laminated structure. In addition, on the surface of the separator 13, a resin layer having high heat resistance such as an aramid resin or a filler layer including a filler of an inorganic compound may be provided.

EXAMPLES

Hereinafter, the present disclosure will be further described with reference to examples, but the present disclosure is not limited to these examples.

Example 1

[Production of Positive Electrode]

95 parts by mass of aluminum oxide ($Al_2O_3$), 2 parts by mass of acetylene black (AB), and 3 parts by mass of polyvinylidene fluoride (PVdF) were mixed in N-methyl-2-pyrrolidone (NMP) and were dispersed in NMP. This was fed to a sieve to obtain an aggregate with an average particle size of 3 μm. This produced the aggregate in which the particles of $Al_2O_3$ and AB were aggregated and were bound by PVdF.

A lithium transition metal composite oxide represented by $LiNi_{0.5}Co_{0.2}O_3O_2$ was used as a positive electrode active material. The positive electrode active material, AB, and PVdF were mixed in a solid content mass ratio of 97:2:1 to prepare a positive electrode mixture slurry with NMP as a dispersion medium. The positive electrode mixture slurry including no aggregate was regarded as the first slurry. In addition, the second slurry was prepared by adding the aggregate with an average particle size of 3 μm to the first slurry at 2.6 volume % with respect to the volume of the positive electrode mixture layer.

The first slurry was applied onto the positive electrode current collector so that the thickness after drying and compressing was 50 μm. The second slurry was applied onto the positive electrode current collector onto which the first slurry had been applied, so that the thickness after drying and compressing was 3 μm. Thereafter, the first slurry was applied onto the surface of the second slurry applied. After drying the coating film, the coating film was compressed to obtain a current collector on both sides of which the positive electrode mixture layer was formed. The current collector was cut into a predetermined electrode size to produce a positive electrode in Example 1.

The positive electrode mixture layer had a thickness of 80 μm and included the above aggregate with an average particle size of 3 μm. The average value of the distance in thickness direction of the positive electrode mixture layer from the surface of the positive electrode current collector to the aggregate (the end of the aggregate closest to the positive electrode current collector), current collector-aggregate average distance, was 50 μm. About 10 pieces of the aggregate were included in the region of 400 μm×80 μm in the positive electrode mixture layer. Specifically, in Example 1, the region in the positive electrode mixture layer was at about 50 μm away from the positive electrode current collector, and about 10 pieces of the aggregate were included in the range of 400 μm×80 μm.

[Production of Negative Electrode]

Graphite powder, a sodium salt of CMC, and a dispersion of SBR were mixed at a solid content mass ratio of 98.7:0.7:0.6 to prepare a negative electrode mixture slurry with water as a dispersion medium. Thereafter, the negative electrode mixture slurry was applied onto both sides of the negative electrode current collector consisting of copper foil, the coating film was dried, and the coating film was then compressed to form a negative electrode mixture layer on both sides of the current collector. The current collector was cut into a predetermined electrode size to produce a negative electrode.

[Preparation of Non-Aqueous Electrolyte]

Ethylene carbonate (EC), ethyl methyl carbonate (EMC), and dimethyl carbonate (DMC) were mixed in a volume ratio of 3:3:4. $LiPF_6$ was dissolved in the mixed solvent so as to obtain a concentration of 1.2 mol/L to prepare a non-aqueous electrolyte.

[Production of Battery]

An aluminum lead was attached to the above positive electrode, a nickel lead was attached to the above negative electrode, and the positive electrode and the negative electrode were spirally wound via a polyethylene separator to produce a wound electrode assembly. The electrode assembly was accommodated in a bottomed cylindrical battery case body having an outer diameter of 18.2 mm and a height of 65 mm, the above non-aqueous electrolyte solution was injected therein, the opening of the battery case body was sealed with a gasket and a sealing assembly to produce a cylindrical non-aqueous electrolyte secondary battery.

Example 2

[Production of Positive Electrode]

95 parts by mass of aluminum oxide ($Al_2O_3$), 2 parts by mass of acetylene black (AB), and 3 parts by mass of polyvinylidene fluoride (PVdF) were mixed in N-methyl-2-pyrrolidone (NMP) and were dispersed in NMP. This was fed to a sieve to obtain an aggregate with an average particle size of 2 μm. The second slurry was prepared by adding the aggregate with an average particle size of 2 μm to the first slurry used in Example 1 at 2.6 volume % with respect to the volume of the positive electrode mixture layer.

The first slurry was applied onto the positive electrode current collector so that the thickness after drying and compressing was 2 pam. The second slurry was applied onto the positive electrode current collector onto which the first slurry had been applied, so that the thickness after drying and compressing was 2 μm. Thereafter, the first slurry was applied onto the surface of the second slurry applied. After drying the coating film, the coating film was compressed to obtain a current collector on both sides of which the positive electrode mixture layer was formed. The current collector was cut into a predetermined electrode size to produce a positive electrode in Example 2. A secondary battery was produced in the same manner as in Example 1 except that the positive electrode was used.

In Example 2, the positive electrode mixture layer had a thickness of 80 μm and included the above aggregate with an average particle size of 2 μm. The average value of the distance in thickness direction of the positive electrode mixture layer from the surface of the positive electrode current collector to the aggregate (the end of the aggregate closest to the positive electrode current collector), current collector-aggregate average distance, was 2 μm. In Example 2, the region in the positive electrode mixture layer was at about 2 μm away from the positive electrode current collector, and about 10 pieces of the aggregate were included in the range of 400 μm×80 μm.

Example 3

[Production of Positive Electrode]

The first slurry and the second slurry used were those that were the same as in Example 2. The first slurry was applied onto the positive electrode current collector so that the thickness after drying and compressing was 5 μm. The second slurry was applied onto the positive electrode current collector onto which the first slurry had been applied, so that the thickness after drying and compressing was 2 μm. Thereafter, the first slurry was applied onto the surface of the second slurry applied. After drying the coating film, the coating film was compressed to obtain a current collector on both sides of which the positive electrode mixture layer was formed. The current collector was cut into a predetermined electrode size to produce a positive electrode in Example 3. A secondary battery was produced in the same manner as in Example 1 except that the positive electrode was used.

In Example 3, the positive electrode mixture layer had a thickness of 80 μm and included the above aggregate with an average particle size of 2 μm. The average value of the distance in thickness direction of the positive electrode mixture layer from the surface of the positive electrode current collector to the aggregate (the end of the aggregate closest to the positive electrode current collector), current collector-aggregate average distance, was 5 μm. In Example 3, the region in the positive electrode mixture layer was at about 5 μm away from the positive electrode current collector, and about 10 pieces of the aggregate were included in the range of 400 μm×80 μm.

Example 4

[Production of Positive Electrode]

The first slurry and the second slurry used were those that were the same as in Example 1. The first slurry was applied onto the positive electrode current collector so that the thickness after drying and compressing was 5 μm. The second slurry was applied onto the positive electrode current collector onto which the first slurry had been applied, so that the thickness after drying and compressing was 3 μm. Thereafter, the first slurry was applied onto the surface of the second slurry applied. After drying the coating film, the coating film was compressed to obtain a current collector on both sides of which the positive electrode mixture layer was formed. The current collector was cut into a predetermined electrode size to produce a positive electrode in Example 4. A secondary battery was produced in the same manner as in Example 1 except that the positive electrode was used.

In Example 4, the positive electrode mixture layer had a thickness of 80 μm and included the above aggregate with an average particle size of 3 μm. The average value of the distance in thickness direction of the positive electrode mixture layer from the surface of the positive electrode current collector to the aggregate (the end of the aggregate closest to the positive electrode current collector), current collector-aggregate average distance, was 5 μm. In Example 4, the region in the positive electrode mixture layer was at about 5 μm away from the positive electrode current collector, and about 10 pieces of the aggregate were included in the range of 400 μm×80 μm.

Comparative Example 1

A positive electrode and secondary battery were produced in the same manner as in Example 1 except than the positive electrode was produced by using only the first slurry that was the same as in Example 1. The second slurry was not used in Comparative Example 1, and the positive electrode in Comparative Example 1 included no aggregate.

Comparative Example 2

[Production of Positive Electrode]

95 parts by mass of aluminum oxide ($Al_2O_3$) and 3 parts by mass of polyvinylidene fluoride (PVdF) were mixed in N-methyl-2-pyrrolidone (NMP) and were dispersed in NMP. This was fed to a sieve to obtain an aggregate with an average particle size of 3 μm. This produced the aggregate in which the particles of $Al_2O_3$ were aggregated and were bound by PVdF. The second slurry was prepared by adding the aggregate with an average particle size of 3 μm to the first slurry used in Example 1 at 2.6 volume % with respect to the volume of the positive electrode mixture layer.

The first slurry was applied onto the positive electrode current collector so that the thickness after drying and compressing was 2 μm. The second slurry was applied onto the positive electrode current collector onto which the first slurry had been applied, so that the thickness after drying and compressing was 3 μm. Thereafter, the first slurry was applied onto the surface of the second slurry applied. After drying the coating film, the coating film was compressed to obtain a current collector on both sides of which the positive electrode mixture layer was formed. The current collector was cut into a predetermined electrode size to produce a positive electrode in Comparative Example 2. A secondary battery was produced in the same manner as in Example 1 except that the positive electrode was used.

In Comparative Example 2, the positive electrode mixture layer had a thickness of 80 μm and included the above aggregate with an average particle size of 3 μm. The average value of the distance in thickness direction of the positive electrode mixture layer from the surface of the positive electrode current collector to the aggregate (the end of the aggregate closest to the positive electrode current collector), current collector-aggregate average distance, was 2 μm. In Comparative Example 2, the region in the positive electrode mixture layer was at about 2 μm away from the positive electrode current collector, and about 10 pieces of the aggregate were included in the range of 400 μm×80 μm.

Comparative Example 3

[Production of Positive Electrode]

95 parts by mass of acetylene black (AB) and 3 parts by mass of polyvinylidene fluoride (PVdF) were mixed in N-methyl-2-pyrrolidone (NMP) and were dispersed in NMP. This was fed to a sieve to obtain an aggregate with an average particle size of 3 μm. The second slurry was prepared by adding the aggregate with an average particle size of 3 μm to the first slurry used in Example 1 at 2.6 volume % with respect to the volume of the positive electrode mixture layer.

The first slurry was applied onto the positive electrode current collector so that the thickness after drying and compressing was 2 μm. The second slurry was applied onto the positive electrode current collector onto which the first slurry had been applied, so that the thickness after drying and compressing was 3 μm. Thereafter, the first slurry was applied onto the surface of the second slurry applied. After drying the coating film, the coating film was compressed to obtain a current collector on both sides of which the positive electrode mixture layer was formed. The current collector was cut into a predetermined electrode size to produce a positive electrode in Comparative Example 3. A secondary battery was produced in the same manner as in Example 1 except that the positive electrode was used.

In Comparative Example 3, the positive electrode mixture layer had a thickness of 80 μm and included the above aggregate with an average particle size of 3 μm. The average value of the distance in thickness direction of the positive electrode mixture layer from the surface of the positive electrode current collector to the aggregate (the end of the aggregate closest to the positive electrode current collector), current collector-aggregate average distance, was 2 μm. In Comparative Example 3, the region in the positive electrode mixture layer was at about 2 μm away from the positive electrode current collector, and about 10 pieces of the aggregate were included in the range of 400 μm×80 μm.

Comparative Example 4

[Production of Positive Electrode]

95 parts by mass of aluminum oxide ($Al_2O_3$) and 3 parts by mass of polyvinylidene fluoride (PVdF) were mixed and dispersed in N-methyl-2-pyrrolidone (NMP). This was fed to a sieve to obtain an aggregate with an average particle size of 3 μm. This produced the aggregate in which the particles of $Al_2O_3$ were aggregated and were bound by PVdF. The second slurry was prepared by adding the aggregate with an average particle size of 3 μm to the first slurry used in Example 1 at 2.6 volume % with respect to the volume of the positive electrode mixture layer.

The first slurry was applied onto the positive electrode current collector so that the thickness after drying and compressing was 50 μm. The second slurry was applied onto the positive electrode current collector onto which the first slurry had been applied, so that the thickness after drying and compressing was 3 μm. Thereafter, the first slurry was applied onto the surface of the second slurry applied. After drying the coating film, the coating film was compressed to obtain a current collector on both sides of which the positive electrode mixture layer was formed. The current collector was cut into a predetermined electrode size to produce a positive electrode in Comparative Example 4. A secondary battery was produced in the same manner as in Example 1 except that the positive electrode was used.

In Comparative Example 4, the positive electrode mixture layer had a thickness of 80 μm and included the above aggregate with an average particle size of 3 μm. The average value of the distance in thickness direction of the positive electrode mixture layer from the surface of the positive electrode current collector to the aggregate (the end of the aggregate closest to the positive electrode current collector), current collector-aggregate average distance, was 50 μm. In Comparative Example 4, the region in the positive electrode mixture layer was at about 50 μm away from the positive electrode current collector, and about 10 pieces of the aggregate were included in the range of 400 μm×80 μm.

Comparative Example 5

[Production of Positive Electrode]

95 parts by mass of acetylene black (AB) and 3 parts by mass of polyvinylidene fluoride (PVdF) were mixed and dispersed in N-methyl-2-pyrrolidone (NMP). This was fed to a sieve to obtain an aggregate with an average particle size of 3 μm. The second slurry was prepared by adding the aggregate with an average particle size of 3 μm to the first slurry used in Example 1 at 2.6 volume % with respect to the volume of the positive electrode mixture layer.

The first slurry was applied onto the positive electrode current collector so that the thickness after drying and compressing was 50 μm. The second slurry was applied onto the positive electrode current collector onto which the first slurry had been applied, so that the thickness after drying and compressing was 3 μm. Thereafter, the first slurry was applied onto the surface of the second slurry applied. After drying the coating film, the coating film was compressed to obtain a current collector on both sides of which the positive electrode mixture layer was formed. The current collector was cut into a predetermined electrode size to produce a positive electrode in Comparative Example 5. A secondary battery was produced in the same manner as in Example 1 except that the positive electrode was used.

In Comparative Example 5, the positive electrode mixture layer had a thickness of 80 μm and included the above aggregate with an average particle size of 3 μm. The average value of the distance in thickness direction of the positive electrode mixture layer from the surface of the positive electrode current collector to the aggregate (the end of the aggregate closest to the positive electrode current collector), current collector-aggregate average distance, was 50 μm. In Comparative Example 5, the region in the positive electrode mixture layer was at about 50 μm away from the positive electrode current collector, and about 10 pieces of the aggregate were included in the range of 400 μm×80 μm.

[Evaluation of Capacity Retention Rate]

Each of the batteries in the examples and comparative examples were charged to a battery voltage of 4.2 V at a constant current of 0.5 It under an ambient temperature of 25° C., and then charged to a current value of 1/50 It at a constant voltage of 4.2 V. Thereafter, discharge was performed to a battery voltage of 2.5 V at a constant current of 0.5 It. Such charge and discharge were repeated for 500 cycles and the capacity retention rate was determined based on the following formula.

Capacity retention rate=(discharge capacity in 500 cycles/discharge capacity in 1 cycle)×100

TABLE 1

| | Inorganic particles | Conductive agent | Current collector-aggregate average distance/μm | Average particle size of aggregate | Active material D50/μm | Capacity retention rate % |
|---|---|---|---|---|---|---|
| Comparative Example 1 | — | — | — | — | 5 | 80 |
| Comparative Example 2 | Al$_2$O$_3$ | — | 2 | 3 | 5 | 80 |
| Comparative Example 3 | — | AB | 2 | 3 | 5 | 80 |
| Comparative Example 4 | Al$_2$O$_3$ | — | 50 | 3 | 5 | 80 |
| Comparative Example 5 | — | AB | 50 | 3 | 5 | 80 |
| Example 1 | Al$_2$O$_3$ | AB | 50 | 3 | 5 | 81 |
| Example 2 | Al$_2$O$_3$ | AB | 2 | 2 | 5 | 85 |
| Example 3 | Al$_2$O$_3$ | AB | 5 | 2 | 5 | 82 |
| Example 4 | Al$_2$O$_3$ | AB | 5 | 3 | 5 | 82 |

As can be seen from the results shown in Table 1, all of the batteries in the examples have excellent cycle characteristics as compared with the batteries in the comparative examples. In addition, the batteries in Examples 2 to 4 with the aggregate arranged in the vicinity of the positive electrode current collector have improved cycle characteristics as compared with than the battery in Example 1 with the aggregate added to the entire positive electrode mixture layer, and therefore have excellent cyclic characteristics. Of the batteries in Examples 2 to 4 with the aggregate arranged in the vicinity of the positive electrode current collector, the battery in Example 2 with the aggregate arranged at the position closest to the positive electrode current collector has improved cycle characteristics as compared with the batteries in Examples 3 and 4.

REFERENCE SIGNS LIST 10 secondary battery
11 positive electrode
12 negative electrode
13 separator
14 electrode assembly
15 battery case
16 exterior can
17 sealing assembly
18, 19 insulating plate
20 positive electrode lead
21 negative electrode lead
22 projecting portion
23 bottom plate
24 lower vent member
25 insulating member
26 upper vent member
27 cap
28 gasket
30 positive electrode current collector
31 Positive electrode mixture layer
32 positive electrode active material
33, 37 conductive agent
35 aggregate
36 inorganic particles
40 intermediate layer

The invention claimed is:

1. A positive electrode for a secondary battery, comprising:
a current collector; and
a mixture layer formed directly on at least one surface of the current collector,
wherein the mixture layer comprises a mixture of an electrode active material, a conductive agent, a binder and a particulate aggregate composed of: inorganic particles that do not intercalate or deintercalate Li; the conductive agent; and the binder that binds the inorganic particles and the conductive agent together,
wherein the particulate aggregate is included at 1.3 volume % or more with respect to a volume of the mixture layer; and
wherein an average particle size of the aggregate is 1 μm or more and 5 μm or less.

2. The positive electrode for a secondary battery according to claim 1, wherein the aggregate is present at least in the direction of a side of the current collector from a center of a thickness direction of the mixture layer.

3. The positive electrode for a secondary battery according to claim 1, wherein an average particle size of the aggregate is smaller than ½ of a volume-based median diameter of positive electrode active material particles included in the mixture layer.

4. The positive electrode for a secondary battery according to claim 1, wherein the inorganic particles constituting the aggregate are at least one selected from manganese oxide, silicon dioxide, titanium dioxide, aluminum oxide, aluminum hydroxide, or boehmite.

5. The positive electrode for a secondary battery according to claim 1, wherein the inorganic particles constituting the aggregate are particles composed of at least one selected from a sulfate, a hydroxide, and an oxide of an alkaline earth metal or an alkali metal.

6. The positive electrode for a secondary battery according to claim 5, wherein the inorganic particles constituting the aggregate are at least one selected from barium sulfate, magnesium hydroxide, magnesium oxide, or lithium oxide.

7. The positive electrode for a secondary battery according to claim 1, wherein the inorganic particles constituting the aggregate are particles composed of at least one selected from aluminum phosphate, or manganese phosphate hydrate.

8. The positive electrode for a secondary battery according to claim 1, wherein the aggregate includes the inorganic particles as a largest in mass component thereof.

9. The positive electrode for a secondary battery according to claim 8, wherein a content of the inorganic particles in the aggregate is 40% by mass or more and 99% by mass or less with respect to a mass of the aggregate.

10. The positive electrode for a secondary battery according to claim 1, wherein an average particle size of the inorganic particles is 0.01 μm or more and 1 μm or less.

11. The positive electrode for a secondary battery according to claim 1, wherein the aggregate includes at least one selected from carbon black, acetylene black, ketjen black, or graphite as the conductive agent.

12. The positive electrode for a secondary battery according to claim 1, wherein the aggregate includes at least one selected from fluororesin, polytetrafluoroethylene, polyvinylidene fluoride, polyacrylonitrile, polyimide resin, acrylic resin, or polyolefin resin as the binder.

13. A secondary battery, comprising:
   the positive electrode for a secondary battery according to claim 1;
   a negative electrode; and
   an electrolyte.

* * * * *